(No Model.) 3 Sheets—Sheet 3.
W. B. DONATHEN.
CORN POPPING MACHINE.
No. 518,664. Patented Apr. 24, 1894.
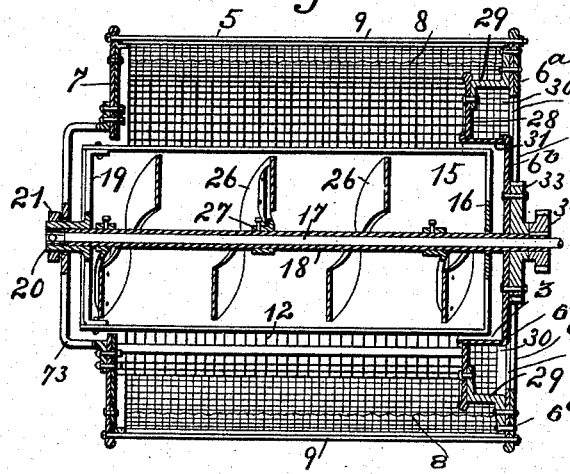
Fig. IV.
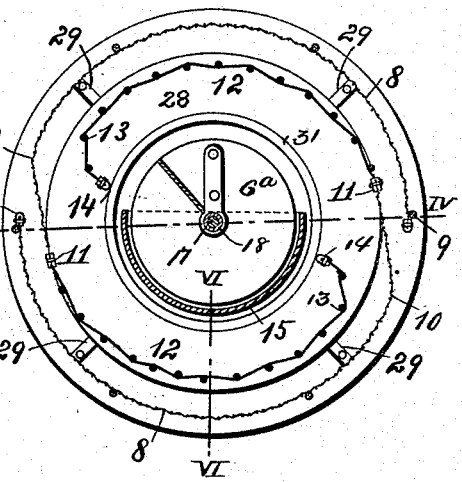
Fig. V.
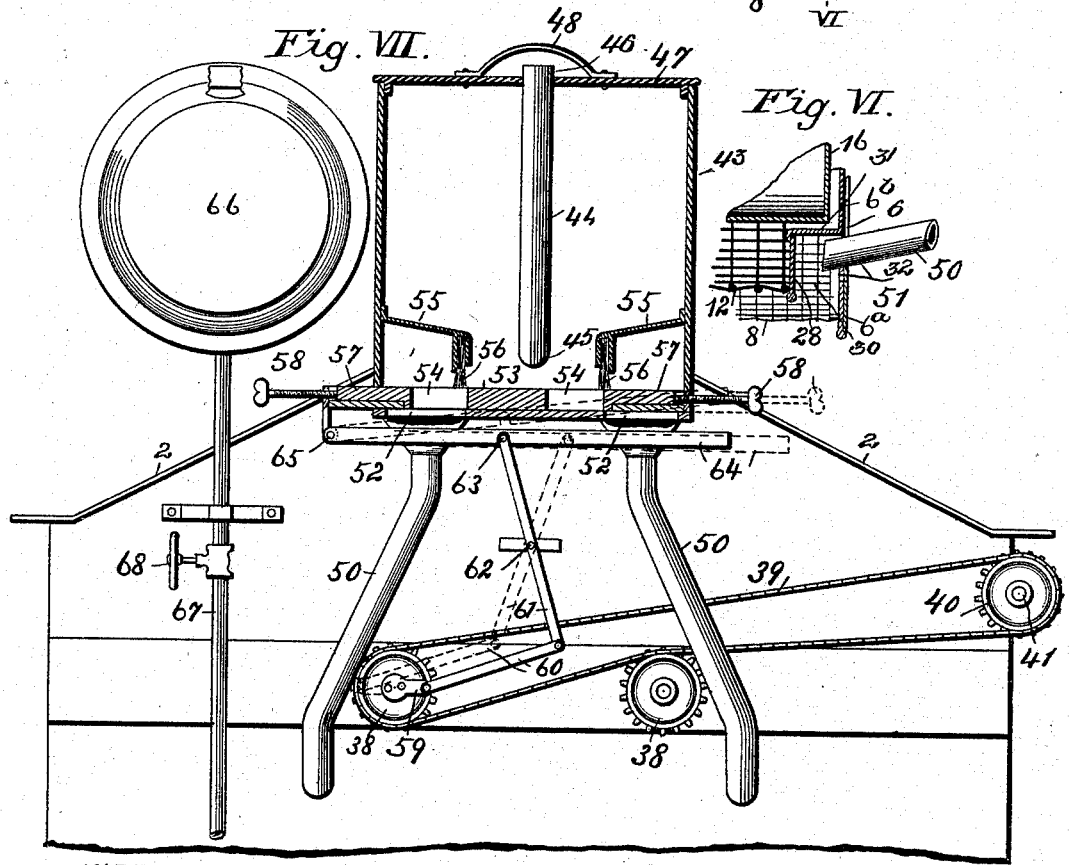
Fig. VII. Fig. VI.
Witnesses:
F. G. Fischer
Jas. E. Knight
Inventor:
W. B. Donathen
By Knight Bros.
Attys.

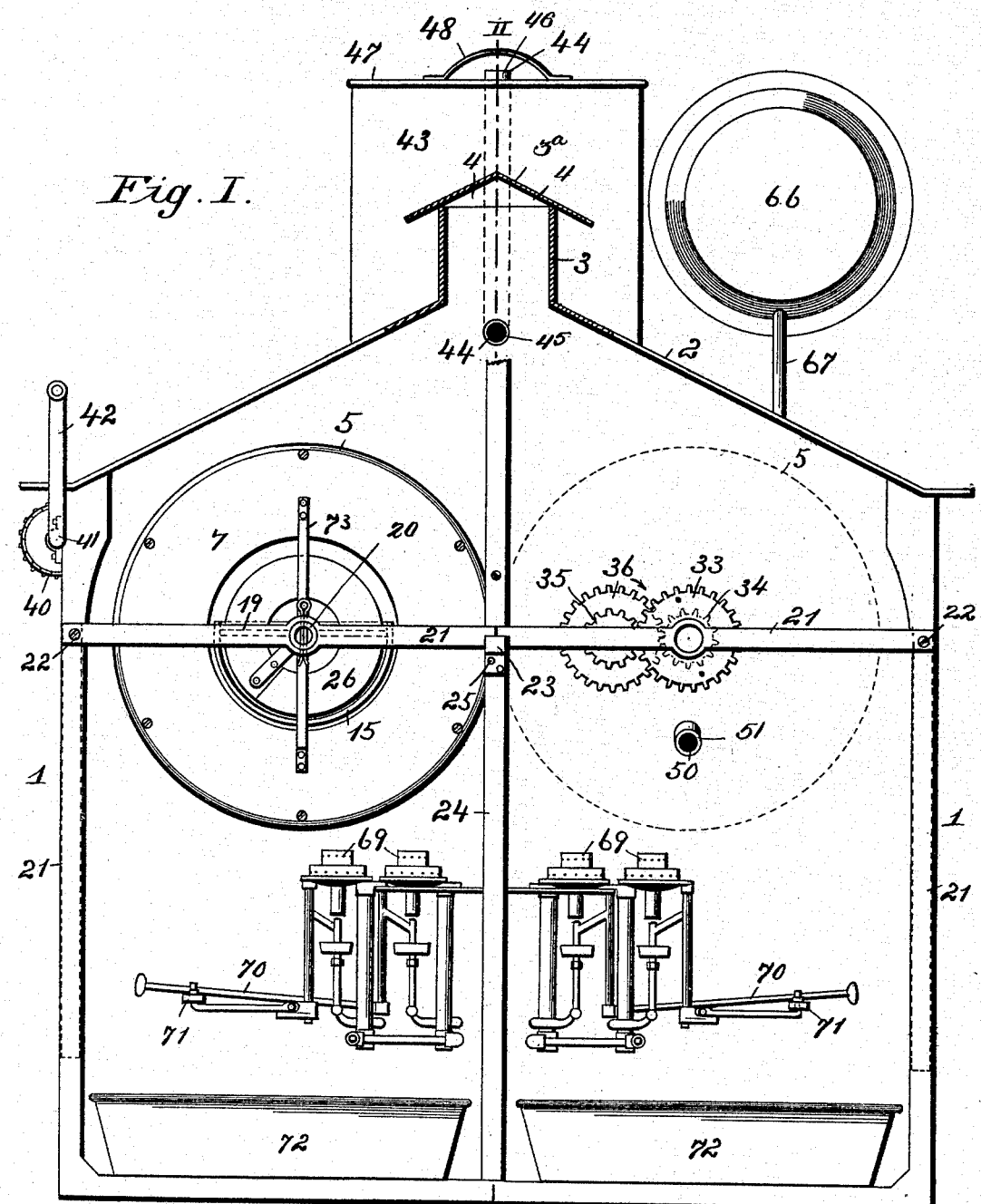

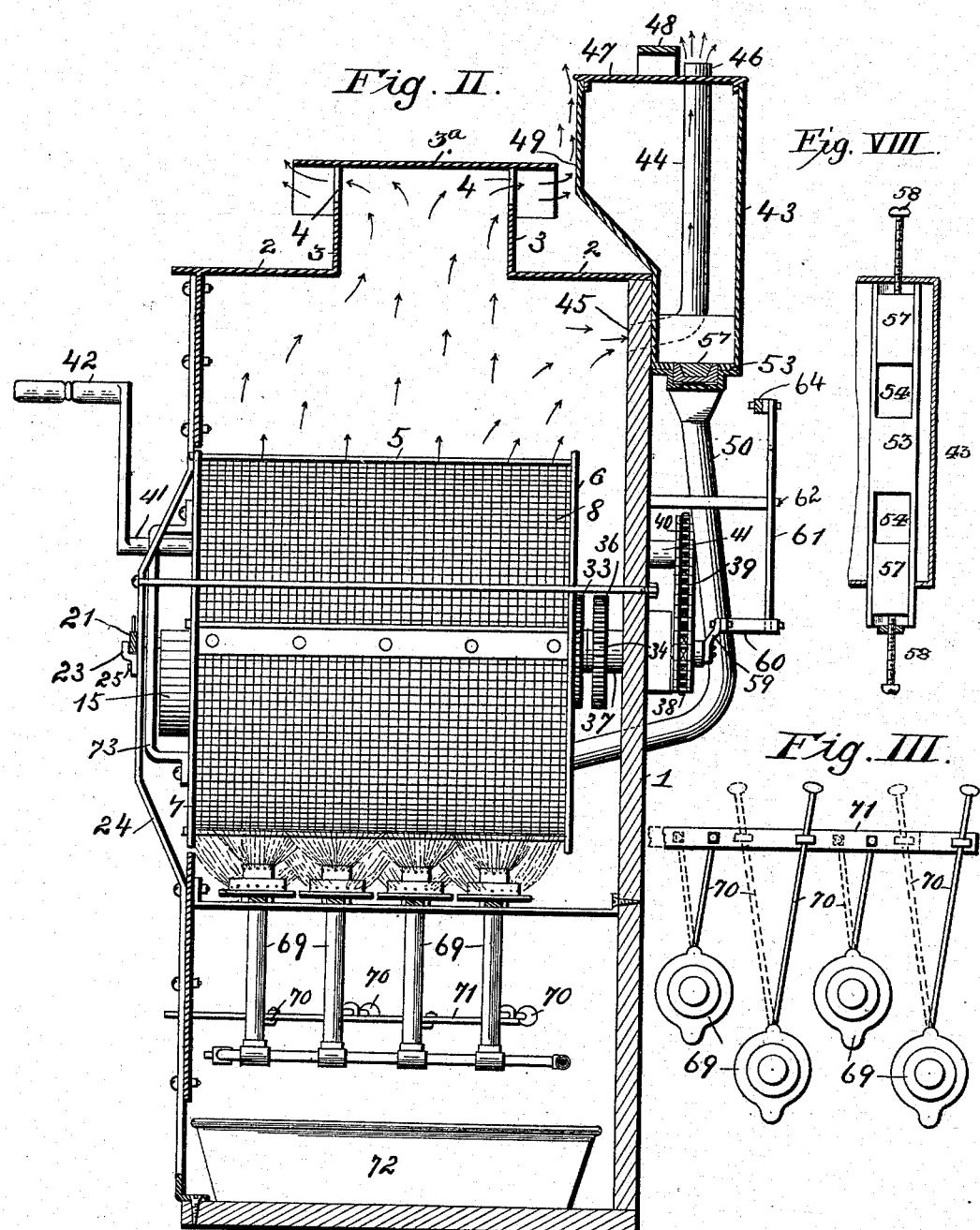

UNITED STATES PATENT OFFICE.

WILLIAM B. DONATHEN, OF KANSAS CITY, MISSOURI.

CORN-POPPING MACHINE.

SPECIFICATION forming part of Letters Patent No. 518,664, dated April 24, 1894.

Application filed April 24, 1893. Serial No. 471,529. (No model.)

*To all whom it may concern:*

Be it known that I, WILLIAM B. DONATHEN, of Kansas City, in the county of Jackson and State of Missouri, have invented certain new and useful Improvements in Corn-Popping Machines, of which the following is a full, clear, and exact description, reference being had to the accompanying drawings, which form a part of this specification.

My invention relates to a certain new and useful machine for popping corn, whereby the corn is conveyed automatically to the popping cylinders after the same has been heated in a reservoir attached to the machine; also to the peculiar construction and operation of the popping cylinders and the means for supplying heat whereby the corn is popped; and my invention consists in certain features of novelty hereinafter described and pointed out in the claims.

Figure I, represents a front elevation of my improved popping machine, showing one of the popping cylinders in place within the machine, the other cylinder omitted in order to more clearly show the gear by which the cylinders and the discharge screw are operated. Fig. II, is a vertical section taken on line II, II, of Fig. I. Fig. III, is a plan view showing the means whereby the gasoline burners may be turned on or off at will. Fig. IV, is a longitudinal section of one of the corn popping cylinders, said section being taken on line IV, IV, of Fig. V. Fig. V, is in part a rear view of one of the popping cylinders. Fig. VI, is a detail section taken on line VI, VI, of Fig. V. Fig. VII, represents a rear view of the upper part of the machine, showing the reservoir in section. Fig. VIII is a plan view of the sliding block of the feed mechanism.

Referring to the drawings: 1, represents a shell or casing surrounding the popping cylinders, said shell having a roof 2, provided with a ventilator extension 3, formed with side apertures 4, and surmounted by a hood $3^a$.

5, represents the popping cylinders having heads 6, 7, at their respective ends to which is secured a fine outer gauze 8, the outer gauze, 8, starting at a point 9, extending part way around the heads 6, 7, to a point 10, whence it converges inward and connects at 11, with a coarser gauze 12. The gauze 8, is formed of two sections constructed in the same manner, each section running substantially half way around the cylinder, at which point they converge as before stated, and connect with the coarser gauze. The coarser gauze, which runs parallel with the outer, finer gauze a portion of the way around the cylinder, converges inward at a point 13, and stops at a point 14, near the center of the cylinder. The coarser gauze 12, is formed of two sections secured to the cylinder, each section running substantially half way around said cylinder.

15, represents a trough secured within the cylinder 5, at its rear end by means of a cross section 16, having an opening through which a central shaft 17, and a sleeve 18, pass, the forward end of the trough being secured by cross piece 19, to a collar 20, resting in a movable cross bar 21; the outer end of said cross-bar being pivoted to the shell 1, as shown at 22, and having its inner end resting in a bracket 23, secured to the central standard 24, as shown at 25, in order to hold said collar 20, and support the forward end of the popping cylinders, the trough 15, thus remaining stationary.

26, represents a screw within the trough 15, the blades of said screw being secured to the sleeve 18, as shown at 27, thus as the sleeve 18, revolves around the shaft 17, the pop-corn is discharged at the forward end of the machine from the trough 15.

The rear end of the popping cylinder is constructed of a head 6, before described, consisting of an outer portion $6^a$, and a portion, 28, of less diameter, a short distance within the cylinder and connected with the outer portion $6^a$, by means of brackets 29. The purpose of setting the portion 28, of the head within the cylinder a short distance is to form an annular space 30, the purpose of which will be described hereinafter. The outer portion $6^a$ of the head 6, does not extend continuously from the outer periphery of the same to the central shaft, but is connected as before described by the brackets 29, with the inner section 28, of the head, said inner section 28, being connected at its inner edge by an annular flange 31, with the inner section $6^b$ of the head 6, thus leaving an annular space through the outer portion $6^a$ of the head 6, for the passage of the corn on its way to the cylinder to be popped, the inner gauze 12, being secured at its rear end to the inner portion 28.

33, represents a gear wheel secured to the inner section 6ᵇ, of the rear head; and 34, represents a gear of less diameter secured to the sleeve 18, to which the screw 26, is attached. To the rear of the shell 1, is journaled a gear 35, which meshes with the larger gear 33, secured to the popping cylinder; and 36 represents a large gear supported by the shell, said gear meshing with the smaller gear 34, secured to the sleeve 18, for operating the screw 26. The shaft 37, to which the gears 35, 36 are connected extends through the shell and is provided at its outer end with a sprocket wheel 38, with which a sprocket chain 39, is connected, said sprocket chain passing over at its opposite end a sprocket wheel 40, secured to a shaft 41, said shaft being journaled to the outer side of the shell, and may be provided with a crank 42, or a drive wheel, not shown, for rotating the sprocket wheel, and thus rotating the popping cylinder and the screw for forcing the pop corn out of the trough 15. By using a different sized gear as shown, the popping cylinder and the screw will be driven at variable speed, the speed being regulated so far as the cylinder is concerned to rotate it at a sufficient degree of speed to properly pop the corn, and the feed of the screw being regulated so as to discharge the corn from the trough as fast as it is popped.

43, represents a reservoir secured preferably near the top of the shell, as shown in Fig. II, a pipe 44, connecting with the inside of the shell, as shown at 45, extending up through said reservoir and out at the top of the same, as shown at 46, said reservoir being provided with a convenient lid 47, having a handle 48, for the removal of the same; thus the greater portion of the waste heat arising after the corn is popped is conveyed through the pipe 44, passing through the reservoir 43, and the corn which is placed within said reservoir preparatory to being popped is thereby heated before passing into the cylinder by means of the surplus heat that would otherwise be wasted. The shell and reservoir are so constructed that the larger portion of the heat passing out from the ventilator 3, will impinge against the side of the reservoir 43, as shown by arrows at 49, in Fig. II, thus aiding in heating the corn within the reservoir. The corn is conveyed automatically through a tube 50, connecting with the bottom of the reservoir to the popping cylinder, the corn being discharged through said tube, as shown at 51, through the opening 32 in the outer rear head of the popping cylinder into the space 30, and discharged onto the finer or popping mesh of the cylinder, whence, as it is popped, and the cylinder revolves, it is thrown on to the coarser mesh 12, and by the peculiar construction of the coarser mesh, the pop corn is conveyed toward the center of the cylinder and thrown into the trough 15, and conveyed out of the cylinder by means of the screw 26, as described. The bottom of the reservoir 43, is provided with openings 52, leading into the tube 50.

53, represents a slide working at the bottom of the reservoir, said slide having openings 54, into which a portion of the corn drops as said slide is reciprocated; then when the slide 53, is moved from the position shown in full lines, Fig. VII, to the position shown in dotted lines, in said figure, a charge of corn is discharged from the opening 54, through the opening 52, down through the tube 50, into the popper.

I have described but a single cylinder and its operation; but have shown a double cylinder, said cylinders being operated in exactly the same manner. Then as the slide reciprocates backward, an opening 54, in the opposite end of said slide feeds a charge of corn through the opposite opening 52, and discharges the same through the opposite tube 50, into the opposite cylinder. In order that not more than a sufficient charge of corn shall pass into either of the tubes 50 at one time, I provide brackets 55, secured within the reservoir said brackets holding brushes 56, which brush off any surplus corn on the reciprocating slide 53; thus feeding the right amount to the cylinders at each reciprocation.

57 represents sliding blocks in the slide 53, having set screws 58 secured thereto, by which means the size of the openings 54, may be regulated at will. The slide 53, is automatically reciprocated by means of a lug 59, secured to the shaft 37, said lug being revolved with the sprocket wheel 38, said lug having pivoted at its end an arm 60, which in turn is connected with an arm 61, fulcrumed to the case 1, as shown at 62, and having its opposite end engaging in a recess 63, of a cross-bar 64, the cross-bar 64, being pivoted to the slide 53, as shown at 65; thus as the sprocket wheel 38, revolves the connecting arms between the arm on the sprocket wheel and the reciprocating slide are forced back and forth, as shown in dotted lines, Fig. VII; thus reciprocating the feeding slide. If it is desired to stop the feeding of the corn for any reason, all that it is necessary to do is to raise the bar 64, as shown in dotted lines, Fig. VII, out of contact with the regulating arm 61, and thus stop the operation of the slide.

66 represents a gasoline or other liquid fuel tank, having a pipe 67, controlled by a valve 68, leading to a series of burners 69, placed within the shell, beneath the cylinders for popping the corn, said burners being set staggered, as shown in Fig. III, having valve rods 70, connecting with a bar 71, whereby all the valves of the burners on one side of the machine may be closed or opened by one movement of the operator.

72 represents drip pans set at the bottom of the shell underneath the burners.

73, represents a cross bar connecting the inner edges of the front head 7, with each other, leaving a central space through which the trough 15, extends, the collar 20, of the trough extending through said cross-piece 73, thus forming a support for the same.

By the use of my machine as described I am enabled to heat the corn before the same is passed into the cylinder, by the use of the heat atoms that would otherwise escape and be lost; and by thus heating the corn before the same is passed into the popping cylinder, I am enabled to pop a much greater quantity of corn in a given time than where the corn is not heated before being fed to the cylinder.

It will be seen that I utilize the waste heat of the machine for heating the pop-corn before popping it. This preliminary heating of the pop-corn changes the character of the pop-corn. If the pop-corn is not heated before passing it into the popping cylinder the cold pop-corn coming in contact with the pop-corn that has been heated therein retards the popping of the pop-corn within the cylinder. If the pop-corn should be heated and then allowed to cool, the nature of the pop-corn is so changed that it is impossible to pop the same advantageously and a great deal of pop-corn under such conditions would remain unpopped. In my machine the pop-corn is heated in close proximity with the popping cylinder and the machine is provided with means whereby after it is heated it is retained in its heated condition until it passes into the popping cylinder, the several steps being successive and necessary to the proper popping of the pop-corn where the same is heated before being popped. The advantage is so great in thus heating the pop-corn before being popped in the popping cylinder that the machine which I have represented will pop over fifty barrels of pop-corn in one day; whereas the same machine, if the pop corn is fed cold into the cylinder will not pop over one-third as much.

I claim as my invention—

1. The method of preparing pop-corn for the popping operation which consists in pre-heating the pop-corn before placing it in the popping chamber of the popper; substantially as set forth.

2. The method of treating pop-corn for the popping operation which consists in preheating the pop-corn and keeping the same in a heated condition until it is placed in the popper; substantially as described.

3. The method of treating pop-corn for the popping operation which consists in placing the pop-corn in a closed reservoir, heating the reservoir so as to pre-heat the contents and discharging the pre-heated pop-corn directly into the popper while in its pre-heated condition; substantially as set forth.

4. The combination of a reservoir for pop-corn, a popper in close proximity to the reservoir, a burner for heating the contents of the popper, and a casing, in which the heated products of combustion are gathered, having openings through which the products of combustion are directed onto the reservoir for pre-heating the contents of the latter; substantially as set forth.

5. The combination of a reservoir for pop-corn, a popper in close proximity to the reservoir, a burner for heating the contents of the popper, a casing, in which the products of combustion are gathered, and a pipe conducting the products of combustion from the casing through the reservoir for pre-heating the contents of the latter; substantially as described.

6. In a corn popping machine, the combination of a shell having a popping device located therein; a ventilator to said shell through which a portion of the heat atoms pass; a reservoir secured to said shell against which a portion of the heat atoms passing from said ventilator impinge; means for conducting heat from said shell through said reservoir; and a feeding device for conducting the corn from said reservoir to the popping device; substantially as set forth.

7. In a corn popping machine, the combination of a suitable shell; a popping device located therein; a reservoir attached to said shell for holding the unpopped corn and an automatic device for feeding the corn from said reservoir to the popping device, said automatic device consisting in a reciprocating slide having apertures for holding a quantity of corn, and tubes into which said corn is discharged from said heating device and conveyed to the popping device; substantially as and for the purpose set forth.

8. In a corn popping machine, the combination of a suitable shell for retaining the heat; a popping device located therein; a reservoir for holding the corn connected with said shell; means for introducing heat from said shell to said reservoir and an automatic feeding device consisting of a reciprocating slide having openings therein for receiving a charge of corn; openings in the bottom of said reservoir with which the openings in the slide register as the same is reciprocated; a suitable driving mechanism, and suitable means for connecting said driving mechanism with said reciprocating slide for operating the same; substantially as and for the purpose set forth.

9. In a corn popping machine, the combination of a suitable popping device; a reservoir connected therewith for holding the unpopped corn; openings in the bottom of said reservoir; tubes leading from said openings to the popping device; a reciprocating slide having openings therein working within said reservoir; brushes for limiting the amount of corn discharged by said sliding device; means for operating the popping device, and arms 60, 61, and bar 64, connecting therewith and with the feeding slide for feeding the corn to the popping device; substantially as and for the purpose set forth.

10. In a corn popping machine, the combination of the popping cylinders; a shell in which said cylinders are located; means for revolving said cylinders; a reservoir for holding a supply of corn means for heating the corn in the reservoir; a tube extending from said reservoir through the shell and extending into an opening at the end of said popping cylinder for discharging the unpopped corn therein; substantially as and for the purpose set forth.

11. In a corn popping machine, the combination of a cylinder provided with heads at each of its ends to which an outer gauze is secured; an annular opening in one of said heads through which corn can be conveyed, and an auxiliary annular head set some distance inside of the cylinder and connected by suitable means with the outer head; substantially as and for the purpose set forth.

12. In a corn popping machine, the combination of a popping cylinder having heads 6, 7, and an annular opening 32, in the head 6; section 28, of the head 6, secured by suitable means to the outer section; a gauze 8, connected with the heads 6, 7; a coarser gauze 12, connected with the head 7, and with the section 28, of the head 6, said coarser gauze leading toward the center of the cylinder; a trough 15, supported at its rear end by a sleeve 18, and supported at its forward end by a collar 20, resting in a cross-bar 21, and a screw 26, working in said trough, and secured to the sleeve 18; substantially as set forth.

13. The combination of a popping device, a heating device, a reservoir, and means for retaining the heat for preheating the pop corn in the reservoir; substantially as described.

14. The combination of a popping device, a reservoir, and a heating device common to both the popping device and the reservoir for preheating the reservoir and popping the pop corn; substantially as described.

15. The combination of a popping device, a heating device for the popping device, a reservoir, and means for preheating the contents of the reservoir before they are discharged into the popping device; substantially as described.

16. In a corn popping machine, the combination of a suitable cylinder having gauze in connection therewith for popping corn and conveying it toward the center; a trough for receiving the pop corn; means for supporting said trough stationary within said cylinder; a sleeve within said cylinder having a screw in connection therewith; suitable gear wheel attached to said sleeve and to said cylinder, said gear connecting with suitable gear attached to the device which supports said cylinders, and means for driving said gear whereby the screw and cylinder may be operated at variable speed while the trough remains stationary; substantially as described and for the purpose set forth.

WILLIAM B. DONATHEN.

Witnesses:
JAS. E. KNIGHT,
F. E. MULLETT.